(12) United States Patent
Nordmark et al.

(10) Patent No.: US 7,171,303 B1
(45) Date of Patent: Jan. 30, 2007

(54) NAVIGATION METHOD AND APPARATUS

(75) Inventors: Per-Ludvig Börje Nordmark, Stockholm (SE); Jonas Paul Thor, Luleå (SE)

(73) Assignee: NordNav Technologies AB, Luleå (SE)

( * ) Notice: Subject to any disclaimer, the term of this patent is extended or adjusted under 35 U.S.C. 154(b) by 0 days.

(21) Appl. No.: 10/544,420

(22) PCT Filed: May 22, 2003

(86) PCT No.: PCT/SE03/00835

§ 371 (c)(1),
(2), (4) Date: Aug. 14, 2006

(87) PCT Pub. No.: WO2004/070318

PCT Pub. Date: Aug. 19, 2004

(30) Foreign Application Priority Data

Feb. 6, 2003 (SE) .................................. 0300303

(51) Int. Cl.
*G01C 21/00* (2006.01)
(52) U.S. Cl. ...................... 701/200; 701/213; 701/214; 701/220; 342/357.06
(58) Field of Classification Search ........ 701/200–213, 701/214, 215, 216, 220, 221; 342/357.01–357.12
See application file for complete search history.

(56) References Cited

U.S. PATENT DOCUMENTS

| 6,122,595 A | 9/2000 | Varley et al. |
| 6,175,807 B1 | 1/2001 | Buchler et al. |
| 6,278,945 B1 | 8/2001 | Lin |
| 6,397,146 B1 | 5/2002 | Bruner |
| 6,516,272 B2 | 2/2003 | Lin |
| 7,117,086 B2 * | 10/2006 | Bye et al. ................. 701/213 |
| 7,133,772 B2 * | 11/2006 | van Diggelen ............ 701/207 |
| 7,136,751 B2 * | 11/2006 | Pinto et al. ............... 701/215 |

FOREIGN PATENT DOCUMENTS

WO    WO 02/050561 A2    6/2002

* cited by examiner

*Primary Examiner*—Richard M. Camby
(74) *Attorney, Agent, or Firm*—Alston & Bird LLP

(57) ABSTRACT

The apparatus generates at least one high-accuracy navigation parameter (P, V, A) by means of a relative sensor system and a radio receiver system. The relative sensor system registers relative movements of the apparatus and produces at least one relative data signal ($\Delta v$, $\Delta \theta$). The radio receiver system receives navigation data signals ($RF_{GNSS}$) from a plurality of external signal sources and produces at least one tracking data signal ($I_{GNSS}$, $Q_{GNSS}$). The radio receiver system includes a central processing unit realized in a software module. A common clock unit produces a first clock signal to form a sampling basis in the radio receiver system and a second clock signal to form a sampling basis in the relative sensor system, where the clock signals are mutually synchronous. Data return loops may be closed in the common software module both with respect to the radio receiver system and the relative sensor system to achieve ultra-tight coupling of the two systems.

13 Claims, 4 Drawing Sheets

US 7,171,303 B1

NAVIGATION METHOD AND APPARATUS

BACKGROUND OF THE INVENTION

1. Field of the Invention

The present invention relates generally to positioning and motion measurement. More particularly the invention relates to a navigation apparatus according to the preamble of claim 1 and a method for generating at least one navigation parameter according to claim 15.

2. Description of Related Art

In the last decades, navigation systems have been developed which facilitate the determination of a position dramatically compared to the earlier known methods. These navigation systems determine positions on basis of accurate radio signals received from a plurality of satellites (at least four), and are commonly referred to as global navigation satellite systems (GNSS:s). There exist several GNSS standards of which the U.S. GPS (Global Positioning System), the Russian correspondence GLONASS (Global Navigation Satellite System) and the European Galileo satellite system represent the most important examples.

Today, most GNSS receivers are primarily implemented in hardware, and are designed to operate exclusively in one of the above systems. However, various software solutions are also known for processing GNSS signals. For instance, the patent document WO02/50561 describes one example of a GPS receiver tracking system for guiding missiles.

If an even more accurate and reliable positioning is desired than what is possible to obtain by means of a purely GNSS-based system, data from a so-called Inertial Navigation System (INS) may also be used.

Solutions for integrating a GPS receiver with an INS have been studied in the literature. Namely, GPS and INS complement each other quite well due to their fundamental differences.

GPS receivers and INS:s measure different quantities. Accelerometers, found in inertial sensors, measure specific forces which are translated to a known coordinate frame with the aid of rate gyro derived measurements. Newton's laws of motion are then applied to provide velocity and position information. GPS is a radio navigation system. As such, GPS receivers measure satellites-to-user ranges, and from these measurements, the user position and velocity can be derived. Furthermore, GPS measurements have a long-term stability, however a noisy behavior. INS measurements on the other hand, are only short term stable; but are less noisy than GPS receivers. Moreover, GPS being a radio navigation system, is sensitive to external radio frequency disturbances, while an INS is not, since it is an autonomous system. Hence, an integration of GPS and INS promises to combine the best of both worlds.

A data collection unit presented in the article J. Thor and D. M. Akos, "A Direct RF Sampling Multifrequency GPS Receiver", Proceedings of IEEE International Conference on Position Location and Navigation Symposium, Palm Springs, Calif., April 2002, pp. 44–51, and a GPS software radio presented in the article J. Thor, P-L. Normark, C Ståhlberg, "A High-Performance Real-Time GNSS Software Receiver and its Role in Evaluating Various Commercial Front End ASICs", Proceedings of ION GPS 2002, Portland, Oreg., Sep. 24–27, 2002, pp. 2554–2560 constitute important components in a desired GPS/INS integration platform.

Both GPS and INS are widely used navigation systems. As mentioned above, the systems are different in nature and have their respective strengths and weaknesses. The characteristics of GPS and INS will now be briefly covered. After that follows a brief comparison of the both systems.

GPS is a satellite-based system, which provides an independent position and velocity solution at a rate in the order of 0.1–25 Hz. The precision of the GPS position solution outperforms any other radio navigation positioning system, especially when the price/performance ratios of the different systems are considered. The major strengths of GPS are the high accuracy and the low cost. The errors in the GPS position solution are bounded, however they contain constant or slowly varying biases. These biases may, for instance, be caused by radio signal delays in the troposphere and ionosphere, errors in the GPS emphemeris data and poor satellite geometry. Apart from the bounded biases, the GPS measurements are noisy. The specified received GPS signal power level is at −130 dBm. Thus, there is a visible thermal noise component. Other factors which contribute to the noisy behavior of GPS measurements are local oscillator imperfections and multipath errors. One technique to limit the effects of thermal noise in a GPS receiver is to design the code and carrier tracking loops to have as narrow bandwidth as possible. However a trade-off has to be made between noise performance and dynamics. When the bandwidths of the tracking loops are narrowed a more precise tracking is obtained, due to less noise being present in the pseudorange measurements. However, in a high dynamic environment the tracking loops may loose synchronization because the lock threshold is reduced. Moreover, being a radio navigation system, GPS relies on the availability of the satellite signals. If the line of sight vector from the user to the satellite is covered by obstacles the satellite signal may be lost. The radio signals may also be jammed (intentionally or unintentionally) or spoofed.

INS is an autonomous navigation system, which can provide independent measurements typically in the order of 10–500 Hz. A simplified block diagram of a known strapdown INS is shown in FIG. 1. By strapdown INS is here meant that an IMU 10, which contains the actual sensors, typically accelerometers 11 and gyros 12, is directly strapped down with a carrier and moves with the carrier. The output signals of the strapdown IMU 10 are angular rate $\Delta\theta$ and acceleration $\Delta\theta$ of the carrier.

A set of six sensors, three accelerometers and three gyros, sense the acceleration $\Delta v$ and the angular rate $\Delta\theta$ of a body frame, and deliver this data to a navigation processor 20. The angular rate $\Delta\theta$ is corrected in an angular rate compensation unit 21 to produce a corrected angular rate $\Delta\theta_C$. This measure $\Delta\theta_C$ is then integrated in a first integration unit 23 to obtain a measure of the body's attitude $\theta$ relative to the navigation frame. Correspondingly, any errors in the sensed acceleration $\Delta v$ caused by known sensor imperfections are compensated for in an acceleration compensation unit 22, such that a corrected acceleration $\Delta v_C$ is produced. A coordinate transform unit 24 receives the corrected acceleration $\Delta v_C$ measure, and in response thereto generates a converted acceleration value $\Delta v_{CF}$ with respect to the navigation frame. This measure $\Delta v_{CF}$ is further corrected with a gravity model G, which is realized by means of a unit 25 and an adder 26, to produce a resulting acceleration $\Delta v_{CFG}$. Next, the resulting acceleration $\Delta v_{CFG}$ is integrated once in a second integration unit 27 to obtain a velocity V and a second time in a third integration unit 28 to obtain position P. Each of the integration units 23, 27 and 28 are initialized with a respective appropriate start value $\theta_i$, $V_i$, and $P_i$ to render generation of correct navigation data possible.

There exist another types of IMU:s, such as gimbaled IMU:s. The gimbaled IMU consists of the actual sensors, accelerometers and gyros, which are mounted on a stabilized platform, so that the sensors are isolated from the rotations of the carrier. Naturally, the present invention can be used together with such systems as well.

Due to imperfections in the sensors, the measurements from accelerometers and rate gyros must normally be compensated. The sensors are calibrated, such that the measurements can be compensated for errors in the form of, for instance bias offsets and scale factor errors. The instrument compensation may derive its correction values from a priori known sensors errors or from an initial calibration procedure. However, certain types of errors cannot be handled by instrument compensation. These errors are, for instance, caused by white additive noise and slowly varying random drift of sensor biases. The noise term will result in a random walk after integration with an error variance which increases with time. The sensor bias errors will cause errors in position, velocity and attitude solutions which are unbounded. The integrations in the navigation processing further accumulate the bias. Hence, inertial sensors are not long term stable. On the other hand, the short-term error, i.e. the noise, is low. This can also be seen as an effect from the integrations in the navigation processing. Even if the sensor outputs are noisy the effect thereof will be smoothed by the integration process. Before navigation is started the INS must enter an initialization mode. Here, the sensor may be calibrated to compensate for random bias offsets in start-up. The initial state of the attitude must be determined in an alignment procedure. The initial velocity and position must also be known, so that the integrators can be provided with initial values.

Inertial sensors for precision navigation are very expensive, but with the current evolution of Micro Electrical Mechanical Systems (MEMS) inertial sensors the cost has dropped and is expected to continue to do so. At this date MEMS inertial sensors are by no means as good as state of the art non-MEMS inertial sensors. However MEMS inertial sensor quality is expected to improve.

A summary of different characteristics of GPS and INS is shown in table 1.

TABLE 1

GPS and INS characteristics

| Attribute | GPS | Quality INS |
| --- | --- | --- |
| Cost | Relatively cheap | Expensive |
| Type of system | Relies on external radio signals | Autonomous |
| Update rate | Relatively low | Relatively high |
| Bias errors | Bounded | Unbounded |
| Noise | Relatively high | Relatively low |

It is obvious that GPS and INS have different characteristics. The choice of which system to use for an application is totally dependent on the requirements of that application. However, if both systems are combined in an integrated system, large gains can be obtained in terms of performance and reliability.

Three different levels of GPS/INS integration are theoretically conceivable, namely representing a loose, a tight or an ultra-tight coupling the GPS receiver and the INS.

According to the loosely coupled approach, the GPS receiver and the INS independently compute position and velocity values. The computed values are then blended in a Kalman filter. The GPS derived position and velocity may be used to initialize and aid the INS in either a closed or an open loop configuration. By a closed loop configuration is here meant that feedback is provided from the GPS receiver to the INS; thereby continuously correcting for a drift in one or more IMU:s. This correction is preformed in order to reduce the position, velocity and attitude errors which originate from the IMU-sensor drift in time. In an open-loop configuration, there is no feedback loop. However, the INS relative position is reset from time to time (for example every 10:th second) with an absolute GPS derived position.

In a tightly coupled GPS/INS level of integration, GPS raw observables, pseudoranges and delta ranges are blended with inertial sensor measurements in a Kalman filter. The update rate of the Kalman filter is higher than in the loosely coupled configuration. Usually, the GPS position is updated every second. It is also necessary to pay more attention to the synchronization of the GPS and INS than in the loosely coupled configuration. The tightly coupled GPS/INS mode has one advantage over loosely ditto in that GPS errors may be modeled accurately. Thus, an optimal Kalman filter can be formulated. In similarity with a loosely coupled system, the GPS data can aid the INS system in a closed loop configuration.

However, it is currently relatively expensive to integrate a GPS receiver with an INS, for instance according to the above-described configurations. This is primarily due to the cost of the required high-quality IMU:s. Even though the cost of inertial sensors is expected to decrease significantly with the development of MEMS components a main obstacle remains for developing the GPS/INS algorithm area. There is namely yet no flexible platform for collecting the relevant data. The observability of GPS measurements is often rather limited in hardware GPS receivers. It is therefore by no means a simple task to interface with off-the-shelf components, such as hardware GPS receiver and an IMU.

Moreover, in order to integrate a GPS receiver with an INS it is necessary to consider synchronization of the measurements from the GPS receiver and the INS respectively. The GPS receiver and the INS namely have completely different sampling rates and are mutually unsynchronized. It is therefore inherently difficult to integrate a GNSS receiver (e.g. a GPS receiver) and an INS. The data-blending algorithm requires that the measurements from the GNSS and the INS be synchronized, i.e. that they are measured at the same time. The GPS is time-absolute and has a time stamp associated with every measurement. The INS system has no such timing markers. However, in the above-mentioned coupled systems, the INS measurements are usually time stamped by means of a "software clock", which in turn is based on the GPS measurements. As INS measurements are received by the host processor appropriate values are interpolated to match relevant GPS measurement in time. In order to avoid this interpolation, a timing signal could be sent from the GPS receiver module to the IMU/INS module, wherein the timing signal indicates to the IMU/INS system when to perform measurements. However, this is still a sub-optimal solution, since the synchronization of the GPS receiver and the INS the will be far from perfect.

SUMMARY OF THE INVENTION

The object of the present invention is therefore to provide an accurate navigation solution, which alleviates the problems above and thus offers an ultra-tight integration of a radio navigation and a relative sensor system.

According to one aspect of the invention the object is achieved by the navigation apparatus as initially described, which is characterized in that it includes a common clock unit and a common software module. The common clock unit is adapted to produce a first clock signal to form a sampling basis in the radio receiver system. The common clock unit is also adapted to produce a second clock signal to form a sampling basis in the relative sensor system. Moreover, the common software module is adapted to realize at least one function of the radio receiver system and at least one function of the relative sensor system.

Of course, an important advantage with this design is that the tracking data signals and the relative data signals are synchronized with one another. Furthermore, the common software module enables a very efficient implementation of the relative sensor system, and more important, renders it possible to execute efficient blending operations with respect to the radio navigation data and the relative sensor data. Thus a highly efficient and accurate GNSS/INS-system may be obtained.

According to a preferred embodiment of this aspect of the invention, the common software module includes the central processing unit. This is namely advantageous with respect to, for instance cost efficiency, processing speed and power consumption.

According to another preferred embodiment of this aspect of the invention, the central processing unit includes a Kalman filter, which is adapted to receive the tracking data signals, the relative data signals, and based thereon, produce a composite tracking return signal and a composite relative return signal. The Kalman filter also feeds back the composite tracking return signal within the radio receiver system, and feeds back the composite relative return signal to the relative sensor system. Hence, the data return loops are closed in the common software system. Thereby, a synchronization between these signals can be guaranteed.

According to yet another preferred embodiment of this aspect of the invention, the common clock unit includes a local oscillator and at least one divider unit. The local oscillator is adapted to generate the first clock signal, which typically has a relatively high frequency. Each of the at least one divider unit receives the first clock signal, and based thereon, generates a respective second clock signal, i.e. a signal having a lower frequency than the first clock signal. This design is desirable because it ensures that the first and second clock signals are mutually synchronous.

According to still another preferred embodiment of this aspect of the invention, the relative sensor system includes an IMU, which is adapted to produce a relative data signal in the form of a velocity signal and/or an angular signal. Namely, although the relative sensor system may include many types of sensors, it is desirable if it at least includes an IMU.

According to another preferred embodiment of this aspect of the invention, the IMU includes a sensor arrangement, at least one analog-to-digital converter and an inertial navigation sensor processor. Preferably, the inertial navigation sensor is comprised in the same processor as the software module which realizes the at least one function of the radio receiver system. The sensor arrangement, in turn, contains at least one inertial sensor of which each is adapted to produce a respective analog sensor signal. The at least one analog-to-digital converter is adapted to receive the second clock signal and the at least one analog sensor signal. In response to these signals, the at least one converter produces a respective digital sensor signal. The inertial navigation sensor processor is adapted to receive the at least one digital sensor signal, and in response thereto, produce the relative data signal. This design is desirable because thereby an efficient digitalization of the relative sensor signals is accomplished. Moreover, the digital sensor signals are synchronized with the at least one tracking data signal.

According to yet another preferred embodiment of this aspect of the invention, the sensor arrangement contains at least one temperature sensor, each of which is adapted to produce a respective temperature signal. The inertial navigation sensor processor is adapted to receive this temperature sensor signal, and based thereon, compensate for any bias drift of the at least one inertial sensor. Thereby, temperature data may be used to compensate for a bias drift in inertial sensors, such as gyros and accelerometers. Preferably, the temperature sensor is sampled on basis of a signal from the common clock unit, such that also the temperature data signal is synchronized with the tracking and the relative data signals.

According to still another preferred embodiment of this aspect of the invention, the relative sensor system includes an optical unit, which is adapted to produce the at least one relative data signal on basis of optical pulses reflected against objects in proximity to the apparatus. Hence, the optical unit may be a camera or a laser system. This is advantageous because thereby navigation based on distinctive terrain objects is enabled.

According to another preferred embodiment of this aspect of the invention, the relative sensor system includes a radar unit which is adapted to produce the at least one relative data signal on basis of radar echoes received from objects in proximity to the apparatus. Again, this enables navigation based on distinctive terrain objects.

According to a preferred embodiment of this aspect of the invention, the relative sensor system includes an odometer unit which is adapted to produce at least one of the at least one relative data signal. The odometer unit may aid any map matching navigation method by measuring distance and/or velocity, and is therefore desirable. As a complement to the odometer unit, a compass may be used to measure a heading.

According to another aspect of the invention, the object is achieved by a method of generating at least one high-accuracy navigation parameter, which includes the steps of: producing a first clock signal; producing a second clock signal on basis of the first clock signal, such that the rate of the second clock signal is synchronous with the rate of the first clock signal; registering relative spatial movements, and in response thereto, producing at least one analog sensor signal; sampling the at least one analog sensor signal on basis of the second clock signal to produce corresponding at least one digital sensor signal; receiving radio navigation data signals from a plurality of external signal sources; sampling the radio navigation data signals on basis of the first clock signal to produce a corresponding digital navigation data signal; receiving the at least one digital sensor signal and the digital navigation data signal in a common software module; and synchronously processing the at least one digital sensor signal and the digital navigation data signal in the common software module to produce the at least one navigation parameter.

The advantages of the method according to the invention are apparent from the discussion hereinabove with reference to the proposed navigation apparatus.

By providing the above ultra-tight integration of a radio navigation receiver (such as a GNSS receiver) and a relative sensor system, the invention renders it possible to determine a position also if less than four satellites are available for measurements. In fact, only one satellite is required to correct for a drift in the relative sensor system and produce an accurate position solution. Moreover, during periods of total radio signal outage, the relative sensor system may be used for dead reckoning.

Under certain conditions, a radio navigation receiver may produce relatively noisy position and velocity signals. According to the invention, these signals may be smoothed by using the position and velocity signals from the relative sensor system filtered in the Kalman filter. Generally, the invention makes it possible to combine the long-term stability of a GNSS receiver with the short-term stability of a relative sensor system, and thereby obtain a highly desirable synergy effect.

Since, according to the invention, the relative sensor system has a higher update rate of position and velocity than the radio navigation receiver, the combined bandwidth of the system is high in comparison to a pure GNSS solution. By aiding the radio navigation tracking loops with relative sensor measurements, the proposed solution is also made relatively insensitive to jamming and spoofing.

Moreover, by using measurements derived from relative sensors to aid or to close the tracking loops, these loops can be made less sensitive to the dynamics of the system. Essentially the relative sensors assist in removing a majority of the dynamics of the system. Thereby, the receiver only needs to track the dynamics of the radio navigation signal and the local clock of the radio navigation receiver. This, in turn, means that the bandwidth of tracking loops can be made comparatively narrow, which increases the signal to noise ratio in the radio navigation receiver.

Furthermore, according to the invention, the radio navigation receiver may provide the relative sensor system with information for calibrating its inertial sensors. The relative sensor system may also derive its initial navigation states from the radio navigation receiver. In closed loop operation, radio navigation measurements may be used to correct data derived from inertial measurement units; while in an open loop configuration the radio navigation receiver may periodically reset the relative sensor system states.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED
EMBODIMENTS OF THE INVENTION

As mentioned above, the invention proposes an ultra-tight integration of a radio receiver navigation system with a multitude of relative sensors, such as IMU:s, temperature sensors, radars, odometers and optical sensors. According to the invention, any relative sensor capable aiding the navigation and motion measurement of a carrier may be integrated with a radio navigation receiver. However, in order to simplify the presentation, the following description particularly describes the integration of a GPS receiver and a number of IMU:s, such that these units form a coupled and very flexible GPS/INS navigation and motion system. Naturally, the proposed platform can also be used with other satellite navigation system, such as the European Galileo satellite system, the Russian GLONASS, or equivalent satellite navigation systems as well as with any land based radio navigation system. Also, other types of relative sensors than IMU:s may be integrated in the platform. Thus, cameras, odometers and radars may be integrated instead of, or as a complement to, the IMU:s.

According to the invention, the difficulty to synchronize radio navigation data and IMU data is solved by sampling the inertial sensors with a clock, which is synchronous to the radio navigation sampling clock. By sampling both systems with the same sampling clock, the stream of samples from each of the systems will be synchronous at the lowest possible level, before any manipulation (by hardware or software) is made to the data. For example, the inertial sensor data from the IMU:s and the radio navigation data from the front end may be collected in a Field Programmable Gate Array (FPGA) based PC card. The PC card may be further attached to a standard laptop PC. All processing of the low level data is accomplished in the host PC. Thereby, full observability of both radio navigation and INS data is obtained. This will be described in further detail below with reference to the FIGS. 4–6.

Figure 1:
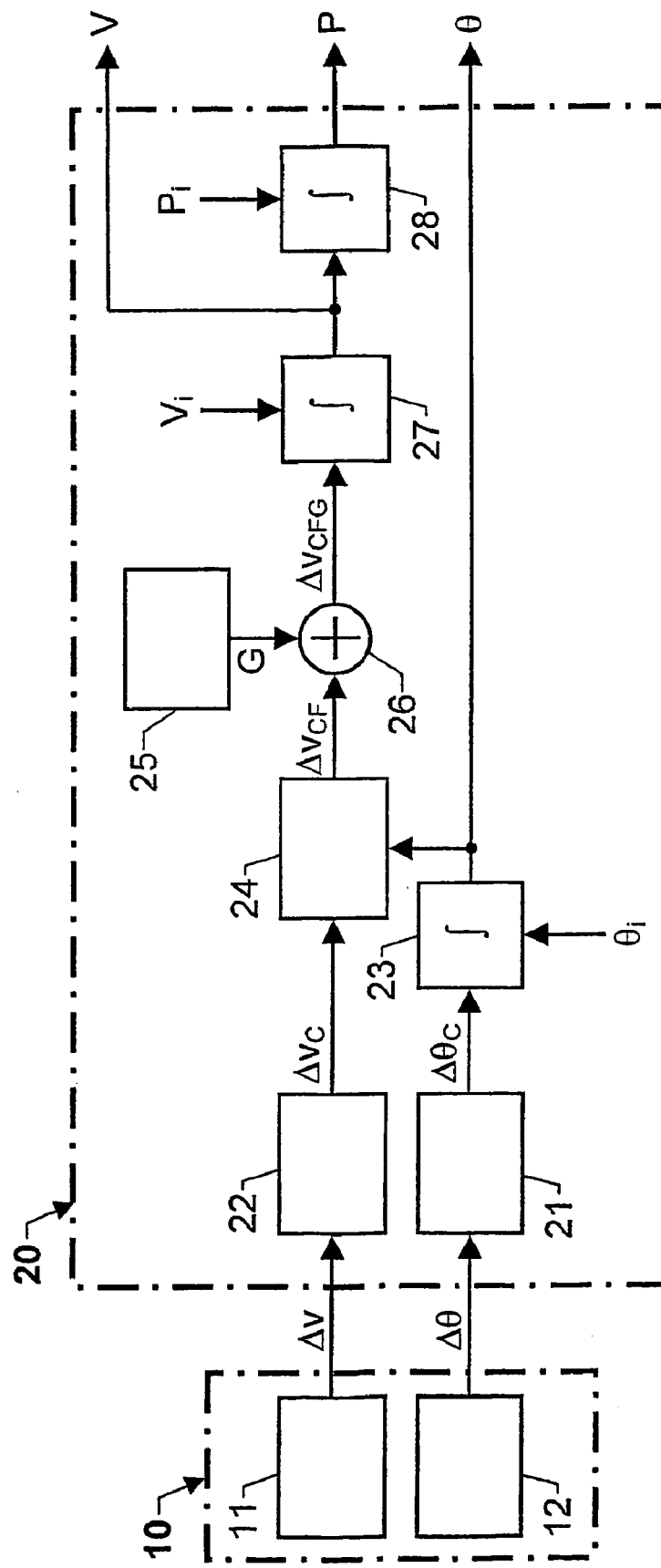
FIG. 1 shows a per se known navigation system including inertial sensors.
Figure 2:
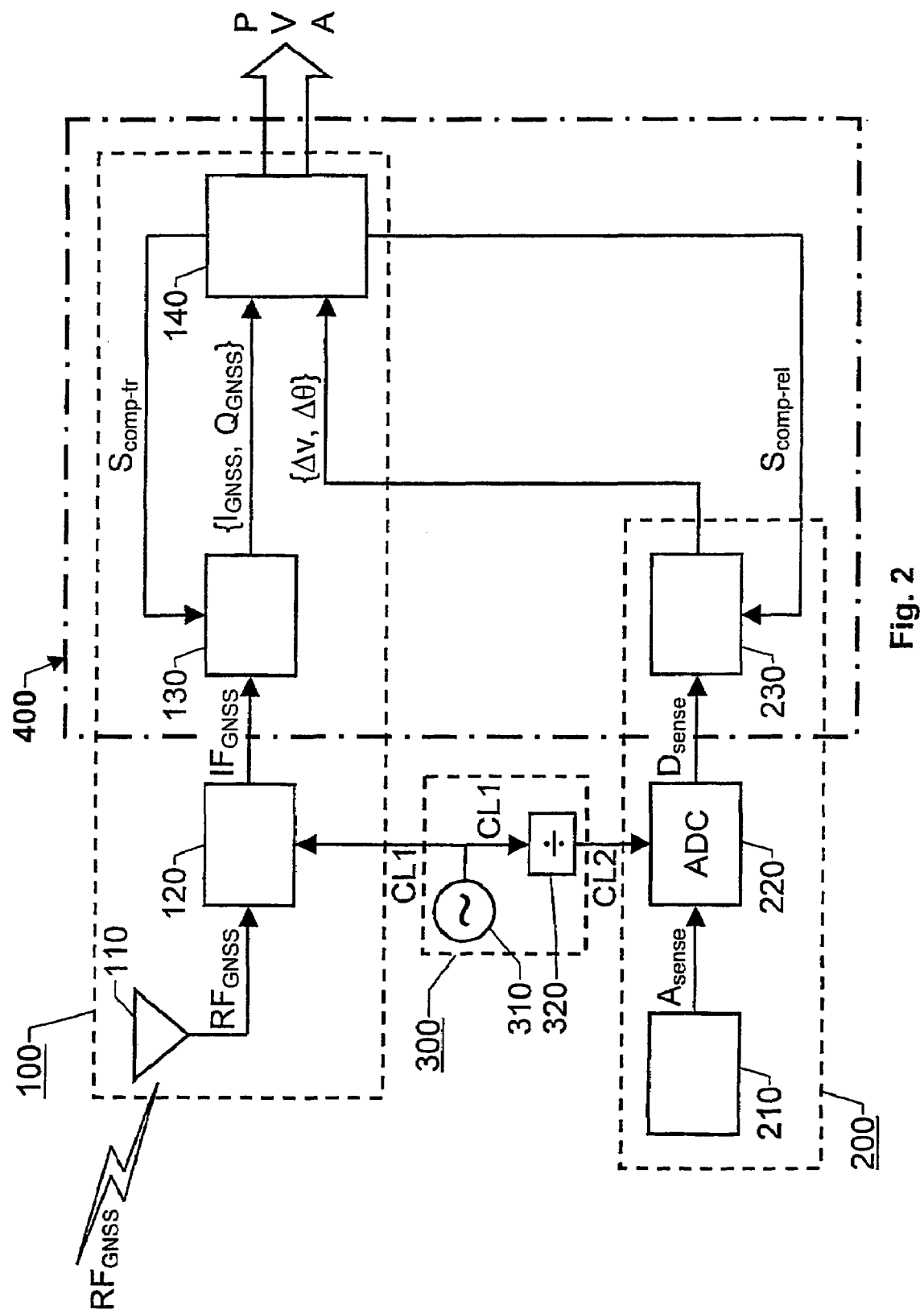
FIG. 2 illustrates, by means of a block diagram, a general navigation apparatus according to the invention.

FIG. 2 shows a block diagram over a general navigation apparatus according to the invention. The apparatus represents an example of the proposed ultra-tight GPS/INS design. The design includes both hardware and software components, the latter of which a majority are realized in a common software module 400. Thus, both a radio receiver system 100 and a relative sensor system 200 are partly accomplished by means of the common software module 400.

Additionally, the apparatus includes a common clock unit 300, which preferably is located outside common software module 400. The common clock unit 300 produces a first clock signal CL1 and a second clock signal CL2 to form sampling bases in the radio receiver system 100 and the relative sensor system 200 respectively. The common clock unit 300 may include a local oscillator 310, which is adapted to generate the first clock signal CL1; and a divider unit 320, which is adapted to receive the first clock signal CL1, and based thereon, generate the second clock signal CL2.

Provided that the digital navigation data signal IF$_{GNSS}$ is a GPS intermediate frequency signal, it is preferable to sample this signal at 4–40 MHz. The sample widths may vary from 1–4 bits depending on the GPS front end used. The inertial sensor data-sampling rate is typically three orders of magnitude less, (say 0,2–50 kHz) than the corresponding GPS sampling rate, with sample widths ranging from 12–24 bits depending on the quality of the inertial sensors. Even though processing of inertial data by no means is a trivial task, adding inertial sensor data processing to the GPS software receiver is feasible from a computational perspective, given the efficient implementation of the GPS software signal processing and the available processing power in a modern PC. By conducting the GPS signal processing entirely in software it is also possible to efficiently implement the required INS (or other sensor system) software, GPS software and blending algorithms (e.g. Kalman Filter) in the same microprocessor; which is essential for an efficient and accurate GPS/INS system.

The navigation apparatus generates a set of high-accuracy navigation parameters P, V and A, which typically describe navigation data, such as position, velocity and attitude. The relative sensor system 200 is adapted to register relative movements of the apparatus. In response to these movements, the relative sensor system 200 produces relative data signals $\Delta v$ and $\Delta \theta$ which according to a preferred embodiment of the invention describe changes in the velocity V and apparatus' orientation. Preferably, the relative sensor system 200 contains an inertial navigation system, which produce the relative data signals $\Delta v$ and $\Delta \theta$.

The radio receiver system 100 is adapted to receive navigation data signals $RF_{GNSS}$ from a plurality of external signal sources, for instance in the form of satellites in a GNSS. Based on the received navigation data signals $RF_{GNSS}$, the radio receiver system 100 produces one or more tracking data signals, for example represented by an in-phase component $I_{GNSS}$ and a quadrature component $Q_{GNSS}$.

Preferably, the navigation data signals $RF_{GNSS}$ enter the radio receiver system 100 via an antenna 110 and are pre-processed in a radio front-end unit 120, e.g. a GPS front end. The radio front-end unit 120 also receives the first clock signal CL1. Based on the navigation data signals $RF_{GNSS}$ and the first clock signal CL1, the radio front-end unit 120 produces a digital navigation data signal $IF_{GNSS}$, corresponding to the navigation data signals $RF_{GNSS}$. Thus, the navigation data signals $RF_{GNSS}$ are down converted and sampled on basis of the first clock signal CL1, which is the common local oscillator clock signal used by radio front-end unit 120. The digital navigation data signal $IF_{GNSS}$ is fed to the common software module 400. Consequently, the antenna 110 and the radio front-end unit 120 are preferably located outside the common software module 400.

However, according to a preferred embodiment of the invention, a correlator unit 130 and a central processing unit 140 of the radio receiver system 100 are included in the common software module 400. The correlator unit 130 is adapted to receive the digital navigation data signal $IF_{GNSS}$ and a composite tracking return signal $S_{comp-tr}$. Based on these signals, the correlator unit 130 produces the tracking data signals $I_{GNSS}$ and $Q_{GNSS}$ (i.e. correlates samples representing the digital navigation data signal $IF_{GNSS}$). The tracking data signals $I_{GNSS}$ and $Q_{GNSS}$ are fed to the central processing unit 140.

In response to the tracking data signals $I_{GNSS}$ and $Q_{GNSS}$ and the relative data signals $\Delta v$ and $\Delta \theta$, the central processing unit 140 generates the composite tracking return signal $S_{comp-tr}$. This feedback signal $S_{comp-tr}$ to the correlator unit 130 renders it possible to adjust a local replica of the navigation data signal $RF_{GNSS}$ in order to track this signals. Correspondingly, the central processing unit 140 generates a composite relative return signal $S_{comp-rel}$, which is fed to the relative sensor system 200. This feed back signal $S_{comp-rel}$ renders it possible to correct any sensor bias and drift.

An inertial navigation system of the relative sensor system 200 may in turn include a sensor arrangement 210, an analog-to-digital converter 220 and an inertial navigation sensor processor 230. The sensor arrangement 210 includes at least one inertial sensor which is adapted to produce a respective analog sensor signal $A_{sense}$, for instance representing movements in one or more directions in space. The analog-to-digital converter 220 is adapted to receive the second clock signal CL2, the analog sensor signal $A_{sense}$, and in response thereto, produce a digital sensor signal $D_{sense}$ corresponding to the analog sensor signal $A_{sense}$.

The inertial navigation sensor processor 230 is adapted to receive the digital sensor signal $D_{sense}$ and the composite relative return signal $S_{comp-rel}$. In response to these signals, the processor 230 produces one or more relative data signals $\Delta v$ and/or $\Delta \theta$ depending on the number and nature of the digital sensor signal(s) $D_{sense}$.

Since the second clock signal CL2 originates from the same source as the first clock signal CL1, the at least one analog sensor signal $A_{sense}$ is sampled synchronously to the navigation data signals $RF_{GNSS}$. The second clock signal CL2 is namely generated by an integer division of the first clock signal CL1 in the divider unit 320. Thereby, the sampling rate of the sensor signal(s) $A_{sense}$ is reduced in relation to the sampling rate of navigation data signals $RF_{GNSS}$. Typically, the navigation data signals $RF_{GNSS}$ must be sampled much faster than the sensor signal(s) $A_{sense}$, e.g. a factor 1000 times. Moreover, it is preferable to buffer samples representing the digital navigation data signal $IF_{GNSS}$ together with samples representing the digital sensor signal $D_{sense}$, and transfer the samples to a microprocessor which realizes the common software module 400 by means of a direct memory access (DMA) transfer.

Moreover, the central processing unit 140 preferably includes a Kalman filter, which is adapted to perform an appropriate blending algorithm to combine the tracking data signal $I_{GNSS}$ and $Q_{GNSS}$ with the relative data signals $\Delta v$ and $\Delta \theta$, and in response thereto, on one hand produce an adequate composite tracking return signal $S_{comp-tr}$ to the correlator unit 130, and on the other hand, produce an adequate composite relative return signal $S_{comp-rel}$ to the inertial navigation sensor processor 230. Of course, in addition to the composite tracking return signal $S_{comp-tr}$ and the composite relative return signal $S_{comp-rel}$, the central processing unit 140 produces the resulting navigation parameters P, V and A.

The relative data signals $\Delta v$ and $\Delta \theta$ thus aid the tracking loops in the radio receiver system 100. By using this approach the bandwidth of the tracking loops in the radio receiver system 100 may be narrowed, and a higher signal to noise ratio is gained (which in turn results in higher accuracy and better jamming resistance). This requires a relatively high update rate of the blending algorithm (e.g. realized by a Kalman filter) in the central processing unit 140, typically in the order of 50–1000 Hz.

According to a preferred embodiment of the invention, the sensor arrangement 210 includes at least one temperature sensor. Each of these sensors is adapted to produce a respective temperature signal to be fed to the inertial navigation sensor processor 230, such that the processor 230 may compensate for any bias drift of the inertial sensors. Further details pertaining to this temperature compensation will be discussed below with reference to the FIGS. 4–6.

Moreover, in addition to, or as a complement to the above-mentioned inertial sensors, the relative sensor system 200 may include sensors in the form of cameras (digital or analog), radar units, optical sensors (e.g. based on laser technology), odometers, compasses, barometers or altimeters.

For example, a camera unit enables map matching by taking updated photographs. The camera unit can be used to repeatedly capture images of sectors of an environment in proximity to the apparatus. The images are then compared to each other and processed by a software (within the camera unit or elsewhere in the apparatus). As a result of the comparison, changes of the surrounding environment may be registered and delivered as one or more relative data signals, for instance to aid navigation. Similarly, radar and/or laser units can be used to register range and/or attitude data. Odometers can measure distance or velocity, while a compass may be used measure heading information.

Figure 3:
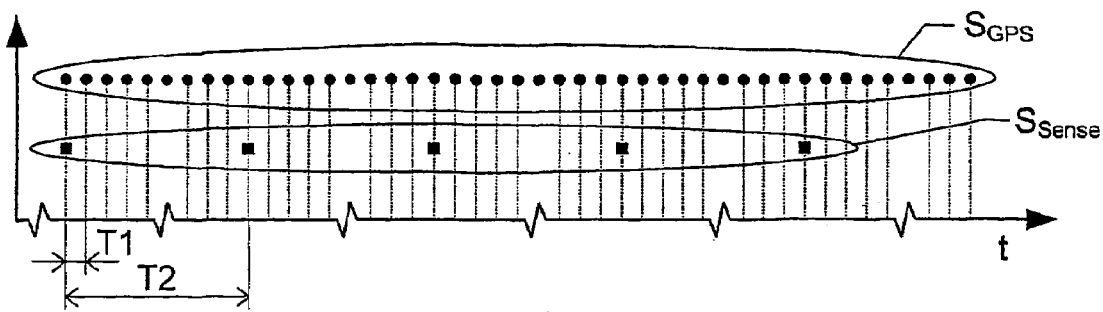
FIG. 3 shows a time graph illustrating a proposed synchronous sampling for received navigation data signals and locally produced relative sensor signals.

According to the invention, data from the lowest possible level is collected with a data acquisition system and processed in real time in a standard microprocessor. There is also a possibility to collect data and write it to a disk for off-line processing for the purpose of algorithm development. FIG. 3 shows a time graph which illustrates a proposed low-level synchronous sampling procedure for a received navigation data signal $S_{GPS}$ (containing GPS samples) and a locally produced relative sensor signal $S_{Sense}$ (containing IMU samples).

Figure 4:
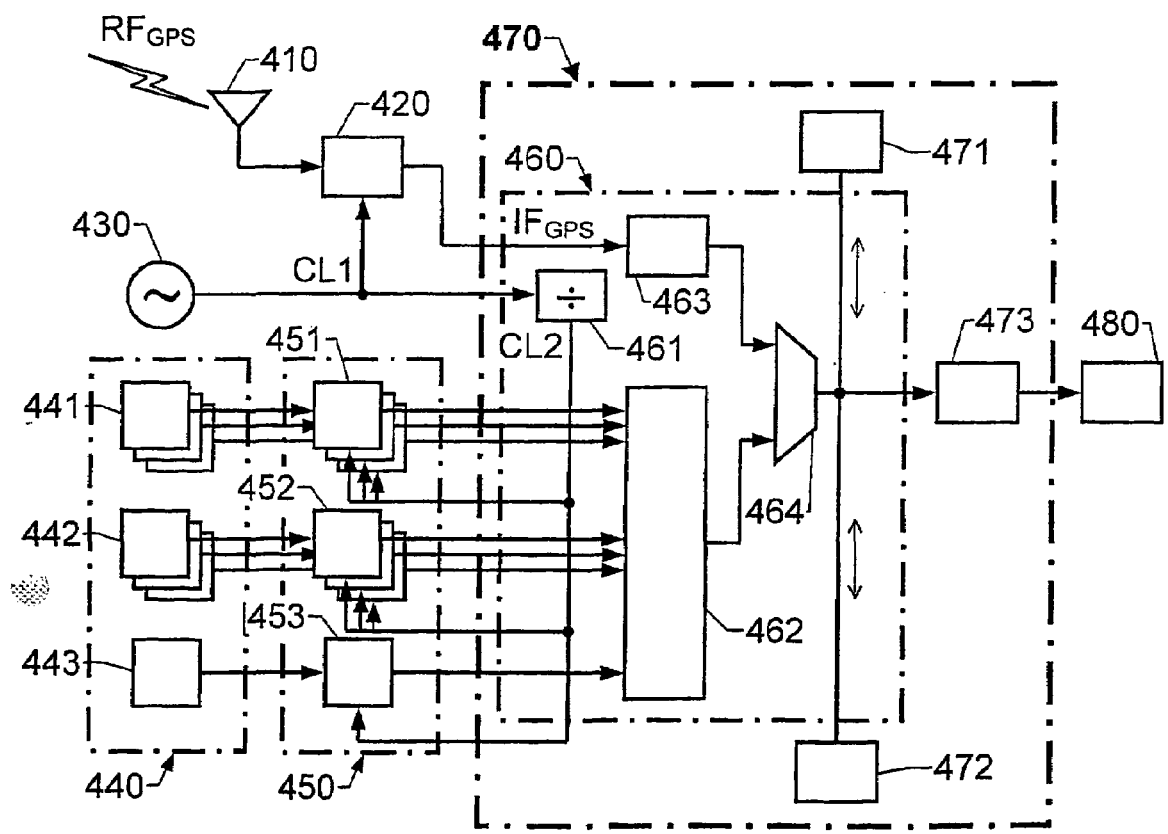
FIG. 4 illustrates a hardware configuration for a navigation apparatus according to a first embodiment of the invention.

FIG. 4 shows a block diagram of a hardware configuration for a navigation apparatus according to a first embodiment of the invention. More specifically, the FIG. 4 shows a GPS/INS integration platform. Digital data $IF_{GPS}$ from a GPS front end 420 and a sensor package 440 is here interfaced to an FPGA based PCMCIA card 470. A local oscillator 430 produces a first clock signal CL1, which is used to clock the GPS front end 420. The GPS front end 420 down converts a GPS radio frequency signal $RF_{GPS}$ received via an antenna 410 and samples a resulting GPS intermediate frequency signal $IF_{GPS}$ in an analog-to-digital converter (ADC), which usually is included in the GPS front end 420. Thereby, IF samples are sampled in a frequency (say 5–50 MHz) determined by the local oscillator 430.

Inside the FPGA 470, the first clock signal CL1 is divided by an integer N in a divider unit 461. The divider unit 461 thus produces a second clock signal CL2 which is synchronous to the first clock signal CL1, however at an N times lower frequency.

The second clock signal CL2 is used to clock six parallel analog-to-digital converters 451 and 452 (located in a digitizing unit 450), which interface a set of IMU:s 441 and 442 respectively, so that IMU samples are streamed at a different frequency (0.2–5 kHz), however synchronous to the GPS samples. This relationship is illustrated in the FIG. 3, where a first interval T1 separates two consecutive GPS samples and a second interval T2=N×T1 separates two consecutive IMU samples. Preferably, the analog-to-digital converters 451 and 452 should be selected to have bit serial outputs in order to limit the necessary input channels.

In addition to the IMU:s 441 and 442, the sensor package 440 includes a temperature sensor 443. Temperature data produced by this sensor 443 is used to compensate for bias drift in gyros and accelerometers of the IMU:s 441 and 442. The temperature data is digitized in an analog-to-digital converter 453 of the digitizing unit 450 and sampled with on basis of the second clock signal CL2, i.e. the same synchronous local oscillator signal as the signals from the IMU:s 441 and 442, in order to provide for over-all synchronous resulting digital data.

When a first piece of GPS data is sampled, the output from the sensor package 440 is sampled simultaneously (i.e. the data from the accelerometer, the gyros and the temperature sensors) in the digitizing unit 450. The GPS data is parallelized to form a 32 bit word and written to an asynchronous FIFO. At the same time, the data from the sensor ADC:s in the digitizing unit 450 are read and stored in a sensor data buffer 462.

The GPS data is stored in the sensor data buffer 462, and when N samples of GPS data have been stored here, this data is written to a first SRAM buffer 471 along with digitized data from the digitizing unit 450. The first SRAM buffer 471 now contains a packet of data consisting of N GPS IF samples and one set of data from the sensor package. We also know that the sensor data was sampled at the same time as the first GPS sample in the packet. Hence we have synchronous data streams at the lowest possible level.

A number of packets are written to the first SRAM buffer 471 before it becomes full. When this happens, data is read from the first SRAM buffer 471 by a host microprocessor (host PC) 480 via a DMA transfer unit 473. DMA transfers efficiently offload the host CPU, so that a minimum of CPU time is spent transferring data. At the same time, GPS data and digitized data from the sensor package 440 are written to a second SRAM buffer 472. Correspondingly, when the second SRAM buffer 472 is filled, the host microprocessor 480 reads from that buffer. The process is then repeated.

Hence, to return to the FIG. 2, the software module 400 is here implemented in the host microprocessor 480. The above described hardware design is a generic design with no specific components defined, apart from the PCMCIA card 470. The interface is flexible as the FPGA is reconfigurable and can easily be adapted for various configurations. It is for instance possible to add one or more GPS front ends if so desired.

Figure 5:
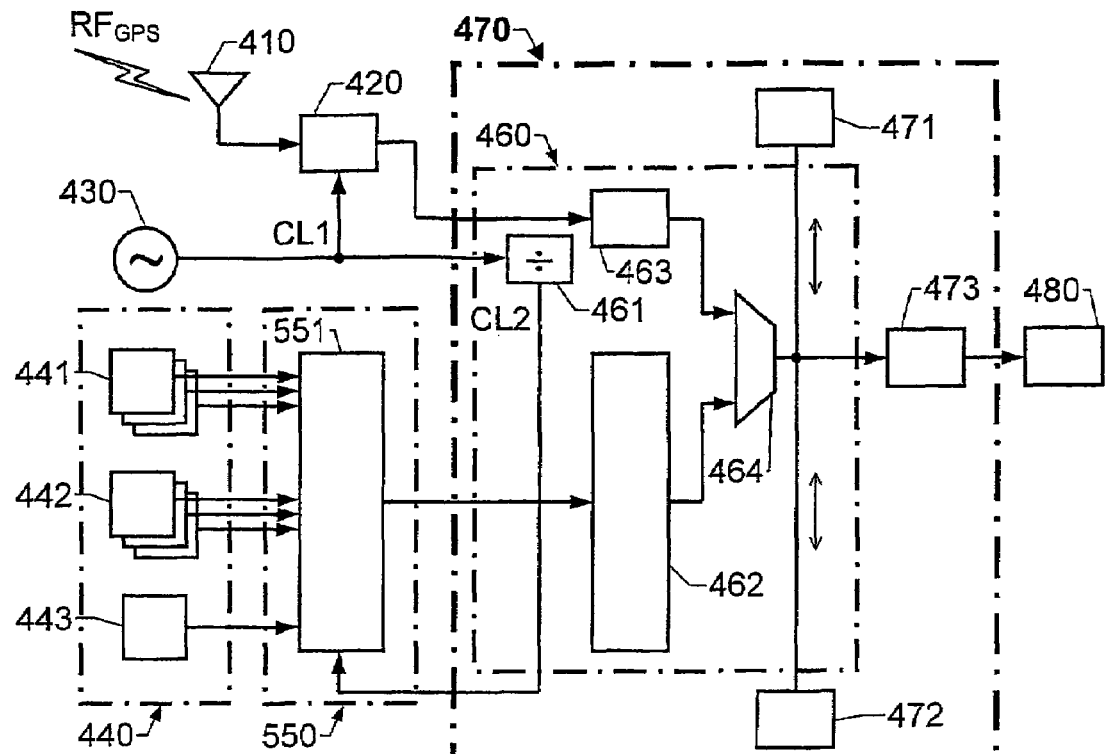
FIG. 5 illustrates a hardware configuration for a navigation apparatus according to a second embodiment of the invention.

FIG. 5 illustrates a hardware configuration for a navigation apparatus according to a second embodiment of the invention. Reference numerals designating the same type units as those already discussed above with reference to the FIG. 4 are here identical to the reference numerals used in the FIG. 4.

The configuration shown in the FIG. 5 uses a common ADC 551 for all the sensors 441, 442 and 443 in the sensor package 440. This common ADC 551, which is housed in a digitizing unit 550 has a multitude of analog inputs and a common digital output. The output is thus multiplexed among the analog inputs.

Moreover, the configuration of FIG. 5 may be extended with sensors in addition to IMU:s. Such additional sensors may be added both to extend the navigation input of the apparatus and to provide for information about the surrounding environment and objects close or near the carrier of the apparatus.

Figure 6:
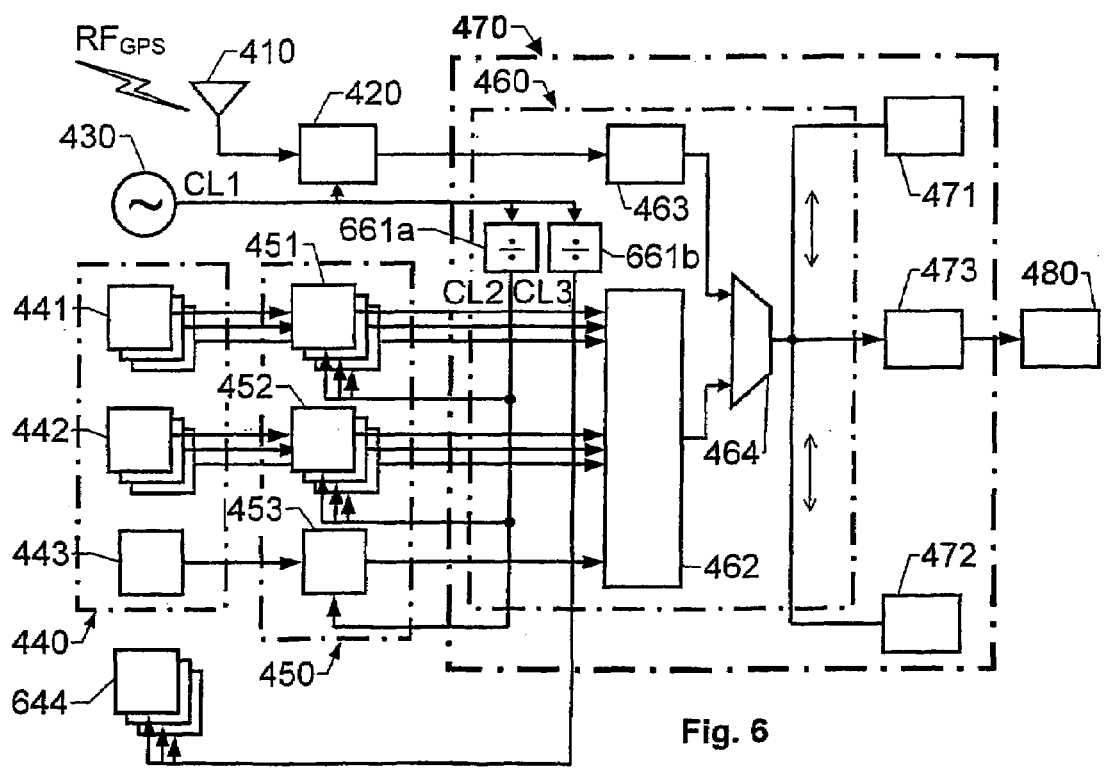
FIG. 6 illustrates a hardware configuration for a navigation apparatus according to a third embodiment of the invention.

FIG. 6 illustrates a hardware configuration for a navigation apparatus according to a third embodiment of the invention. In similarity with the FIG. 5, reference numerals designating the same type units as those already discussed above with reference to the FIG. 4 are identical to the reference numerals used in the FIG. 4.

This embodiment includes a set of additional sensors 644, which are sampled on basis of a third clock signal, derived from the first clock signal CL1 (used as a basis to sample the signal in the GPS front end 420), however different from the second clock signal CL2. Namely, the additional sensors 644 may need to be time divided separately, since the sampling rate being appropriate the additional sensors may be different from both the sampling rate which is appropriate for the IMU-signals and the sampling rate which is appropriate for the GPS signal.

The second clock signal CL2 is generated by a first divider unit 661a, and the third clock signal CL3 is generated by a second divider unit 661b. This design ensures that sample streams from the IMU:S 441 and 442, the GPS front end 420, temperature sensors 443 and the additional sensors 644 are all synchronous.

As mentioned above, the additional sensors 644 may include a camera (digital or analog), a radar unit, an optical sensor (e.g. based on laser technology), an odometer, a compass, a barometer or an altimeter.

The selection of a GPS front end is based around several different factors, such as sampling frequency, number of bits, cost and power consumption. According to a preferred embodiment of the invention, a high performance front end is used which has a 16 MHz sampling frequency and 4 bit sample width.

Selecting a suitable set of sensors is a more difficult task. Factors that must be considered are cost, measurement ranges, size, power consumption and performance. The required measurement ranges are directly related to the dynamics of the system. The performance of a sensor depends on noise levels, bandwidth, scale factor errors and bias drift. High performance sensors are, however, quite expensive and for that reason the applications are limited to where that level of performance is required. The inertial sensors may be classified in three grades; strategic, navigation and tactical grade. The error in the position domain for the different grades is 100 feet/h (30 m/h), 1 nmi/h (1.8 km/h) and 10–20 nmi/h respectively. The error characteristics of a navigation grade INS are summarized in table 2.

TABLE 2

Error characteristics for navigation grade inertial sensors.

| Gyro | | Accelerometer | |
|---|---|---|---|
| Bias drift | Noise (random walk) | Scale factor error | Bias drift | Scale factor error |
| 0.015°/h | 0.04°/√h | 10–50 ppm | 50–100 µg | 10–50 ppm |

Sensors which fit in the strategic, navigation and tactical grade are today very expensive and therefore not realistic to employ in many applications. For example, inclusion of these sensors in automobiles would be more expensive than the automobile itself. Today, even tactical grade inertial sensors are even not in price range of the average general aviation user.

Two further grades of inertial sensors may be defined, namely representing an automotive and a consumer grade. Rough numbers of the error characteristics for sensor in these two grades are shown and compared with reference tactical grade sensors in table 3. The automotive and consumer grade sensors are in the price range of $20–$1000 each. An INS constructed from automotive or consumer grade sensors will have position errors of several kilometers after only a few minutes of operation. Cleary some type of external aiding of the INS is needed to limit the position errors resulting from these low cost sensors.

TABLE 3

Error parameters for inertial sensors

| | Gyro | | Accelerometer | |
|---|---|---|---|---|
| INS Quality | Drift (deg/hr) | Noise (deg/sec) | Drift (g) | Noise (g) |
| Tactical | 0.35 | 0.0017 | $50 \times 10^{-6}$ | $50 \times 10^{-5}$ |
| Automotive | 180 | 0.05 | $1.2 \times 10^{-3}$ | $1 \times 10^{-3}$ |
| Consumer | 360 | 0.05 | $2.4 \times 10^{-3}$ | $1 \times 10^{-3}$ |

Preferably, the selection of ADCs should be based on the signal to noise ratio of the sensor outputs. Ideally the quantization noise of an ADC is:

$$\sigma_q^2 = \frac{\Delta^2}{12}, \quad (1)$$

where $\Delta$ represents the value of one bit. Taking the accelerometer with the full range of $\pm 1.5$ g as an example and assuming an n-bit ADC the RMS quantization error is given by $$\sigma_q = \frac{3}{\sqrt{12} \cdot 2^n}. \quad (2)$$

Stating that the noise RMS error, $\sigma_s$, should be significantly lower than the quantization error noise we obtain $$n \gg \log_2\left(\frac{3}{\sqrt{12} \cdot \sigma_s}\right). \quad (3)$$

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A navigation apparatus for generating at least one high-accuracy navigation parameter (P, V, A) comprising:
   a relative sensor system (200) adapted to register relative movements of the apparatus and in response thereto produce at least one relative data signal ($\Delta v$, $\Delta \theta$),
   a radio receiver system (100) adapted to receive navigation data signals ($RF_{GNSS}$) from a plurality of external signal sources and based thereon produce at least one tracking data signal ($I_{GNSS}$, $Q_{GNSS}$), the radio receiver system (100) including a central processing unit (140) adapted to receive the at least one tracking data signal ($I_{GNSS}$, $Q_{GNSS}$), receive the at least one relative data signal ($\Delta v$, $\Delta \theta$), and based on the received signals produce the at least one navigation parameter (P, V, A),
   a common clock unit (300) adapted to produce a first clock signal (CL1) to form a sampling basis in the radio receiver system (100) and a second clock signal (CL2) to form a sampling basis in the relative sensor system (200), and
   a common software module (400) adapted to realize at least one function (130, 140) of the radio receiver system (100) and at least one function (230) of the relative sensor system (200), the common software module (400) includes the central processing unit (140), and the central processing unit (140) comprises a Kalman filter, said Kalman filter is adapted to
   receive the at least one tracking data signal ($I_{GNSS}$, $Q_{GNSS}$),
   receive the at least one relative data signal ($\Delta v$, $\Delta \theta$), and based on the received signals, produce a composite tracking return signal ($S_{comp-tr}$) and a composite relative return signal ($S_{comp-rel}$),
feed back the composite tracking return signal ($S_{comp-tr}$) within the radio receiver system (100), and
feed back the composite relative return signal ($S_{comp-rel}$) to the relative sensor system (200).

2. The navigation apparatus according to claim 1, wherein said radio receiver system (100) comprises at least one radio front-end unit (120) adapted to receive the first clock signal (CL1), receive the navigation data signals ($RF_{GNSS}$), and based thereon produce a digital navigation data signal ($IF_{GNSS}$).

3. The navigation apparatus according to claim 2, wherein said the radio receiver system (100) comprises a correlator unit (130) adapted to receive the digital navigation data signal ($IF_{GNSS}$), receive the composite tracking return signal ($S_{comp-tr}$) and based on the received signals produce the at least one tracking data signal ($I_{GNSS}$, $Q_{GNSS}$).

4. The navigation apparatus according to claim 1, wherein said common clock unit (300) comprises:
a local oscillator (310) adapted to generate the first clock signal (CL1), and
at least one divider unit (320) adapted to receive the first clock signal (CL1) and based thereon generate the second clock signal (CL2).

5. The navigation apparatus according to claim 1, wherein said relative sensor system (200) comprises an inertial measurement unit adapted to produce a relative data signal in the form of at least one of a velocity signal ($\Delta v$) and an angular signal ($\Delta \theta$).

6. The navigation apparatus according to claim 5, wherein said inertial measurement unit comprises:
a sensor arrangement (210) including at least one inertial sensor of which each sensor is adapted to produce a respective analog sensor signal ($A_{sense}$),
at least one analog-to-digital converter (220) adapted to receive the second clock signal (CL2), receive the at least one analog sensor signal ($A_{sense}$) and in response thereto produce a respective digital sensor signal ($D_{sense}$), and
an inertial navigation sensor processor (230) adapted to receive the at least one digital sensor signal ($D_{sense}$) and in response thereto produce the relative data signal ($\Delta v$, $\Delta \theta$).

7. The navigation apparatus according to claim 6, wherein said sensor arrangement (210) comprises at least one temperature sensor each adapted to produce a respective temperature signal, the inertial navigation sensor processor (230) is adapted to receive the at least one temperature sensor signal and based thereon compensate for any bias drift of the at least one inertial sensor.

8. The navigation apparatus according to claim 1, wherein said relative sensor system (200) comprises an optical unit adapted to produce the at least one relative data signal ($\Delta v$, $\Delta \theta$) on basis of optical pulses reflected against objects in proximity to the apparatus.

9. The navigation apparatus according to claim 1, wherein said relative sensor system (200) comprises a camera unit adapted to produce the at least one relative data signal ($\Delta v$, $\Delta \theta$) on basis of images representing sectors of an environment in proximity to the apparatus.

10. The navigation apparatus according to claim 1, wherein said relative sensor system (200) comprises a radar unit adapted to produce the at least one relative data signal ($\Delta v$, $\Delta \theta$) on basis of radar echoes received from objects in proximity to the apparatus.

11. The navigation apparatus according to claim 1, wherein said relative sensor system (200) comprises an odometer unit adapted to produce at least one of the at least one relative data signal ($\Delta v$, $\Delta \theta$).

12. The navigation apparatus according to claim 10, wherein said relative sensor system (200) comprises a compass unit adapted to produce at least one of the at least one relative data signal ($\Delta v$, $\Delta \theta$).

13. A method of generating at least one high-accuracy navigation parameter (P, V, A) by means of a navigation apparatus, the method comprising:
registering relative movements of the apparatus at a sampling basis given by a particular clock signal (CL1),
producing at least one relative data signal ($\Delta v$, $\Delta \theta$) in response to the registered relative movements,
receiving navigation data signals ($RF_{GNSS}$) from a plurality of external signal sources,
producing at least one tracking data signal ($I_{GNSS}$, $Q_{GNSS}$) in response to the received navigation data signals ($RF_{GNSS}$) based on the particular clock signal (CL1),
producing the at least one navigation parameter (P, V, A) based on the at least one relative data signal ($\Delta v$, $\Delta \theta$) and the at least one tracking data signal ($I_{GNSS}$, $Q_{GNSS}$),
Kalman-filtering the at least one tracking data signal ($I_{GNSS}$, $Q_{GNSS}$) and the at least one relative data signal ($\Delta v$, $\Delta \theta$) to based on these signals produce a composite tracking return signal ($S_{comp-tr}$) and a composite relative return signal ($S_{comp-rel}$),
feeding back the composite tracking return signal ($S_{comp-tr}$) to influence the production of the at least one tracking data signal ($I_{GNSS}$, $Q_{GNSS}$), and
feeding back the composite relative return signal ($S_{comp-rel}$) to influence the production of the at least one relative data signal ($\Delta v$, $\Delta \theta$).

* * * * *